US006989532B2

(12) United States Patent
Harada

(10) Patent No.: US 6,989,532 B2
(45) Date of Patent: Jan. 24, 2006

(54) MASS SPECTROMETER

(75) Inventor: Takahiro Harada, Kyoto-fu (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 11/074,833

(22) Filed: Mar. 9, 2005

(65) Prior Publication Data

US 2005/0199800 A1 Sep. 15, 2005

(30) Foreign Application Priority Data

Mar. 10, 2004 (JP) ............................ 2004-066605

(51) Int. Cl.
*B01D 59/44* (2006.01)

(52) U.S. Cl. ....................... 250/288; 250/289; 250/285

(58) Field of Classification Search ................ 250/288, 250/289, 285; 239/338
See application file for complete search history.

(56) References Cited

U.S. PATENT DOCUMENTS 6,825,462 B2 * 11/2004 Truche et al. ............... 250/288
2003/0209666 A1 * 11/2003 Hirabayashi et al. ....... 250/288
2005/0121608 A1 * 6/2005 Yamauchi et al. .......... 250/288

FOREIGN PATENT DOCUMENTS

JP 2003-517576 5/2003
WO WO 00/19192 4/2000

* cited by examiner

*Primary Examiner*—Nikita Wells
*Assistant Examiner*—Anthony Quash
(74) *Attorney, Agent, or Firm*—Westerman, Hattori, Daniels & Adrian, LLP

(57) ABSTRACT

The present invention provides a mass spectrometer including an ion source for atomizing a liquid sample into ionized droplets and spraying ions in a predetermined direction. According to the present invention, the ion source includes a gas transport pipe and a liquid supply pipe; the gas transport pipe has an ejection port at its front end and a gas supply passage for sending an assist gas to the ejection port; the inner surface of the gas supply passage has a tapered section located in proximity to the ejection port, where the diameter of the tapered section decreases toward the ejection port; the liquid supply pipe is inserted into the gas supply passage so that the front end of the liquid supply pipe is located in proximity to the ejection port; three or more spheres having the same size are inserted between the inner surface of the gas supply passage and the outer surface of the liquid supply pipe; and a pressing mechanism is used to press the spheres onto the tapered section. Being pressed by the pressing mechanism, the spheres move along the tapered section and come closer to the central axis of the liquid supply passage. The gas transport pipe and the liquid supply pipe form a duplex pipe structure having a high degree of coaxiality, which produces a stable flow of ions sprayed in the predetermined direction.

6 Claims, 9 Drawing Sheets

MASS SPECTROMETER

The present invention relates to a mass spectrometer including an ion source for spraying a liquid sample into droplets in a predetermined direction in a stable manner, and for atomizing and ionizing the sprayed sample.

BACKGROUND OF THE INVENTION

In a mass spectrometry, liquid samples are often used as the object to be analyzed. An example is an analysis with a liquid chromatograph mass spectrometer (LCMS), in which a sample dissolved in a solution is separated into components by the liquid chromatography. Then, the components are sequentially sent to the mass spectrometer, which carries out the mass analysis of each component.

For the mass analysis of a liquid sample, a liquid sample ionizer using an assist gas (or nebulizing gas) is employed as an ion source for generating ions to be analyzed. In this ionizer, a liquid sample ejected from a liquid supply pipe is nebulized (i.e. broken into droplets) by a strong stream of gas, called an assist gas or nebulizing gas, flowing along the outer surface of the liquid supply pipe. The gas also functions as a carrier and drier of the droplets, and often as an electrifier of the droplets.

In general, liquid sample ionizers carry out the ionization with the assist gas at roughly atmospheric pressure. The ions generated thereby are introduced into the mass spectrometer unit, the inner space of which is maintained in a high vacuum state.

FIG. 6 schematically shows the construction of a mass spectrometer 10 using an assist gas for ionization. The mass spectrometer 10 includes an ion source 41 for generating ions at roughly atmospheric pressure and a mass spectrometer unit 13 enclosed in a vacuum chamber 12.

The ion source 41 is mainly composed of a gas transport pipe 14 and a liquid supply pipe 15. The gas transport pipe 14 is cylindrical at its center and tapered at its front end. Located at the center of the tapered end of the ion source 41 is a gas supply passage 17 with an ejection port 16 for ejecting the assist gas. The gas transport pipe 14 has, on its side, a gas inlet 18 and a gas supply conduit 19 for introducing the assist gas into the gas supply passage 17. The gas supply conduit 19 is connected to the gas supply passage 17 within the gas transport pipe 14.

The liquid supply pipe 15 is inserted into the gas supply passage 17 of the gas transport pipe 14 to form a duplex pipe structure. The liquid supply pipe 15 extends through the hole 20 formed at the rear end of the gas transport pipe 14 and leads to an external source of the liquid sample, e.g. the liquid chromatograph in the case of an LCMS. The front end of the liquid supply pipe 15 is located close to and slightly sticking out from the ejection port 16.

The liquid sample flowing through the liquid supply passage 21 of the liquid supply pipe 15 is sent to the ejection port 16 of the gas supply passage 17. At the ejection port 16, the assist gas coming from the gas supply passage 17 blows away the liquid sample located at the front end of the liquid supply passage 21, nebulizing and drying the liquid sample. The nebulized liquid sample forms a spray, which is directed toward the pore 22 formed in a wall of the vacuum chamber 13. Thus, the ejection port 16 functions as a spray nozzle for spraying the sample. The sprayed droplets of the liquid sample are dried and atomized before they enter the pore 22.

After passing the pore 22, the sample is detected by the mass spectrometer unit 13, which generates signals used for mass analysis. The mass spectrometer unit 13 may be a quadrupole, an ion trap, or any other type selected in accordance with the purpose of the analysis.

There are several types of ion sources that use the assist gas. FIGS. 7A–7D show examples of conventional ion sources using the assist gas.

FIG. 7A shows an ion source using the electrospray ionization. In this ion source, a high voltage source 25 is connected to the liquid supply pipe 15 to electrify the liquid sample located at the front end of the liquid supply pipe 15 by applying a high voltage to the liquid supply pipe 15. The electrified liquid sample is drawn in a predetermined direction by a potential gradient to form a spray directed frontward from the ejection port 16. Each droplet in the sprayed sample becomes smaller in size as a result of the drying process and/or the electrostatic repulsions due to its own charge, and finally turns into ions. In principle, the electrospray ionization does not necessarily require an assist gas. Under practical conditions, however, it is necessary to efficiently perform the spraying and drying processes when a considerable amount of liquid sample is used. Therefore, even in the case of the electrospray ionization, it is common to insert the liquid supply pipe 15 into the gas supply passage 17 and simultaneously supply the assist gas and the liquid sample from the gas supply passage 17 and the liquid supply pipe 15, respectively.

FIG. 7B shows an ion source using the sonic spray ionization. In this ion source, the high voltage is not applied to the liquid supply pipe 15. Instead, the liquid sample 21 is electrified into ions by the friction between the droplets (i.e. liquid sample) ejected from the liquid supply pipe 15 and the assist gas ejected from the gas supply passage 17.

FIG. 7C shows an ion source using the atmospheric chemical ionization. This ion source includes a heater 26 for producing a gas sample by heating the liquid sample flowing through the liquid supply passage 21. The heater 26 also heats the assist gas flowing through the gas supply passage 17. The heated assist gas and the heated gas sample are simultaneously ejected to dry the gas sample. The dried gas sample is then ionized by an electric discharge from the needle-shaped high voltage electrode 27 to which a high voltage is applied with the high voltage source 25.

FIG. 7D shows an ion source using the atmospheric photo-ionization. This ion source includes an excitation light source 28 in place of the high voltage electrode 27 in FIG. 7C and ionizes the gas sample by irradiating the excitation light 29.

As shown in FIG. 8, in the ion source 41 with the liquid supply pipe 15 inserted into the gas supply passage 17, the liquid supply pipe 15 is supported only by a cantilever structure at the hole 20 formed at the rear end of the gas transport pipe 15. This structure, however, does not assure that the liquid supply pipe 15 is always coaxial with the gas supply passage 17 of the gas transport pipe 14; it may allow the displacement of the central axis of the liquid supply pipe 15 from the central axis of the gas supply passage 17. For example, the displacement may be caused by the self-weight of the liquid supply pipe 15, the use of a liquid supply pipe 15 having an originally poor linearity, or a varying flow of the assist gas.

If the displacement occurs, the traveling direction of the ions contained in the gas sample sprayed from the ejection port 16 is also displaced from the center of the pore 22. This leads to a biased distribution of the ion density, which in turn causes a decrease in the amount of the ions passing through the pore 22. As a result, the intensity of the detection signal of the mass spectrometer unit 13 decreases, which deteriorates the sensitivity of the mass analysis.

One of the simplest methods of solving the above-described problem is to manually adjust the position of the ejection port 16 with respect to the pore 22 and find the best position at which the detection sensitivity is maximized.

Another method of maintaining the coaxiality of the liquid supply pipe 15 and the gas supply passage 17 is to fit a bush into the space between the gas transport pipe 14 and the liquid supply pipe 15.

FIG. 9A is a longitudinal sectional view of the front part of an ion source 42 having a bush 31 for holding the liquid supply pipe 15 within the gas supply passage 17, and FIG. 9B is the cross-sectional view at line A–A' in FIG. 9A.

The bush 31 is fitted into the gas supply passage 17 of the gas transport pipe 14 with a slight gap (e.g. about 5 μm) between the outer circumference of the bush 31 and the inner surface of the gas supply passage 17. The bush 31 has a hole 32 formed at its center, and the liquid supply pipe 15 is fitted into the hole 32 with a slight gap (e.g. about 5 μm) between the inner surface of the hole 32 and the outer surface of the liquid supply pipe 15. Leaving such gaps is necessary to allow the liquid supply pipe 15 and the bush 31 to be removable for cleaning and other maintenance work.

From the working point of view, the existence of the gaps means that the above-described fitting is a "loose fit", not a "close fit", as specified in the Japanese Industrial Standards as JISB0401.

In addition to the hole 32, the bush 31 has four slits 30 for allowing the assist gas to pass through. The slits 30 may be replaced by holes or other types of openings.

The Japanese Patent Publication No. 2003-517576 discloses another method of maintaining the coaxiality of the liquid supply pipe 15 and the gas supply passage 17. According to this method, the liquid supply pipe 15 is surrounded by plural pieces of gas transport pipes 33 having the same shape and size, through which the assist gas is supplied.

FIG. 10A is a longitudinal sectional view of the front part of the ion source 43 having the liquid supply pipe 15 surrounded by plural pieces of gas transport pipes 33 for supplying the assist gas, and FIG. 10B is a cross-sectional view at line B–B' in FIG. 10A.

The above-described three methods address the problems that the liquid supply pipe 15 is displaced and, accordingly, the gas supply passage 17 and the liquid supply pipe 15 are out of the coaxial position. But they cause some other problems.

In the first method, i.e. the manual adjustment of the position of the pore 22 and the ejection port (or nozzle) 16, the adjustment work is very troublesome. Moreover, if the adjustment is insufficient, it is impossible to obtain an adequately high degree of reproducibility of the mass analysis.

In the second method using the bush 31 for holding the liquid supply pipe 15 as shown in FIGS. 9A and 9B, the position of the bush 31 with respect to the inner surface of the gas supply passage 17 is determined by fitting. Similarly, the position of the liquid supply pipe 17 with respect to the inner surface of the hole 32 of the bush 31 is also determined by fitting. In principle, any fitting structure must have a minimal gap between the two elements concerned. This gap inevitably allows the elements to have a room for displacement, so that their position cannot be completely fixed.

This means that the displacement can be as large as the sum of the two gaps, i.e. the first gap between the outer surface of the bush 31 and the inner surface of the gas supply passage 17 and the second gap between the inner surface of the hole 32 of the bush 31 and the outer surface of the liquid supply pipe 15, and the sum will be at least 5 to 10 μm. This displacement is not negligible with respect to the gap between the gas transport pipe 14 and the liquid supply pipe 15, i.e. the distance between the inner surface of the gas supply passage 17 and the outer surface of the liquid supply pipe 15. Such a displacement may cause the detection signal of the mass spectrometer to be weakened or unstable since the ion density varies.

According to the third method shown in FIGS. 10A and 10B, the liquid supply pipe 15 is surrounded by plural pieces of gas transport pipes 33 having the same shape and size, through which the assist gas is supplied. In this structure, the outlets of the gas transport pipes 33 are separated from the outlet of the liquid supply pipe 15 by the thickness of the wall of the gas transport pipe 33. This separation reduces the amount of the assist gas acting on the liquid sample located at the front end of the liquid supply pipe 15, so that the liquid-sheering force of the assist gas significantly decreases. As a result, the liquid sample cannot be fully broken into minute droplets, and the atomization, transport and drying of the liquid sample cannot be adequately performed. This causes an inadequate ionization and accordingly weakens the detection signal of the mass spectrometer. To avoid such a problem, it is necessary to compensate for the shortage of ions by increasing the flow rate of the assist gas to compulsorily promote the ionization.

In view of the above-described problems, an object of the present invention is to provide a mass spectrometer having an ion source constructed so that the gas supply passage for supplying the assist gas and the liquid supply pipe for supplying a liquid sample are maintained in the coaxial position, and the liquid supply pipe is hardly displaced with respect to the gas supply passage.

SUMMARY OF THE INVENTION

Thus, the present invention provides a mass spectrometer having an ion source for ionizing a liquid sample, in which

- the ion source includes a gas transport pipe and a liquid supply pipe;
- the gas transport pipe has an ejection port at its front end and a gas supply passage for sending an assist gas to the ejection port;
- the inner surface of the gas supply passage has a tapered section located in proximity to the ejection port, where the diameter of the tapered section decreases toward the ejection port;
- the liquid supply pipe is inserted into the gas supply passage so that the front end of the liquid supply pipe is located in proximity to the ejection port;
- three or more spheres having the same size are inserted between the inner surface of the gas supply passage and the outer surface of the liquid supply pipe; and
- a pressing mechanism is used to press the spheres onto the tapered section.

The spheres may be preferably positioned in the gas supply passage so that each sphere is in contact with the neighboring spheres on both sides.

The diameter of the spheres may be larger than that of the ejection port.

The pressing mechanism may be constructed to press the spheres onto the tapered section via an urging member.

The distance between the point at which the sphere is in contact with the liquid supply pipe and the front end of the liquid supply pipe may be thirty times as large as the maximum diameter of the liquid supply pipe, or smaller than that.

According to the present invention, the ion source includes: a gas transport pipe having a gas supply passage through which an assist gas flows; and a liquid supply pipe located within the gas supply passage of the gas transport pipe. The gas transport pipe has an ejection port at its front end, and an assist gas is sent through the gas supply passage to the ejection port. In proximity to the ejection port, the inner surface of the gas supply passage has a tapered section, the diameter of which decreases toward the ejection port.

There are at least three spheres having the same size between the inner surface of the gas supply passage and the outer surface of the liquid supply pipe. When the pressing mechanism is operated to press the spheres onto the tapered section, the spheres move along the tapered section and come closer to the ejection port. At the same time, the spheres come closer to the liquid supply pipe and push it toward the center of the tapered section, i.e. the central axis of the gas supply passage.

Thus, the pressure from the three or more spheres holds the liquid supply pipe at the center of the gas supply passage. The direct contacts of the spheres with the tapered section and the outer surface of the liquid supply pipe eliminate the aforementioned gap observed in the fitting structure. Therefore, it is possible to hold the liquid supply pipe accurately on the central axis of the gas supply. The gas transport pipe and the liquid supply pipe form a duplex pipe structure having a high degree of coaxiality.

The spheres may be positioned in the gas supply passage so that each sphere is in contact with the neighboring spheres on both sides. This positioning makes the space between the spheres symmetrical with respect to the central axis, which produces a uniform flow of the assist gas.

The diameter of the spheres may be larger than that of the ejection port. This design prevents the spheres from rolling out from the ejection port. Therefore, for example, it never occurs that the sphere accidentally escapes from the ejection port during cleaning or other maintenance work.

The pressing mechanism may be constructed to press the spheres onto the tapered section via an urging member. This design allows the user to take out the liquid supply pipe by exerting a force against the urging force of the pressing mechanism, without entirely removing the pressing mechanism. Thus, the user can perform the maintenance work in a relatively simple manner.

The distance between the point at which the sphere is in contact with the liquid supply pipe and the front end of the liquid supply pipe may be thirty times as large as the maximum diameter of the liquid supply pipe, or smaller than that. This design ensures the coaxiality of the liquid supply pipe, irrespective of the diameter of the liquid supply pipe.

BRIEF DESCRIPTION OF THE DRAWINGS

FIG. 9A is a longitudinal sectional view and FIG. 9B is the cross-sectional view at line A–A' in FIG. 9A.

FIG. 10A is a longitudinal sectional view and FIG. 10B is the cross-sectional view at line B–B' in FIG. 10A.

DETAILED DESCRIPTION OF A PREFERRED EMBODIMENT

Figure 1:
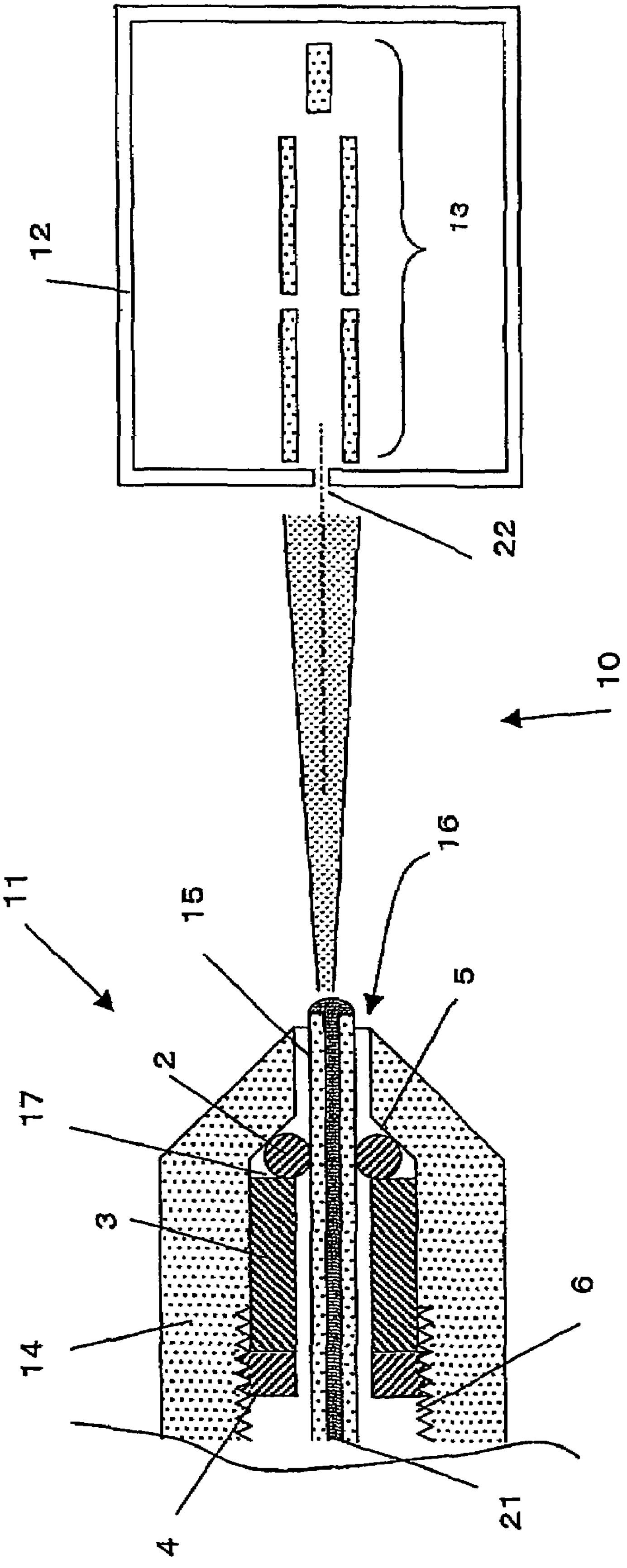
FIG. 1 is a longitudinal sectional view of the front part of the ion source used in a mass spectrometer as an embodiment of the present invention.
Figure 6:
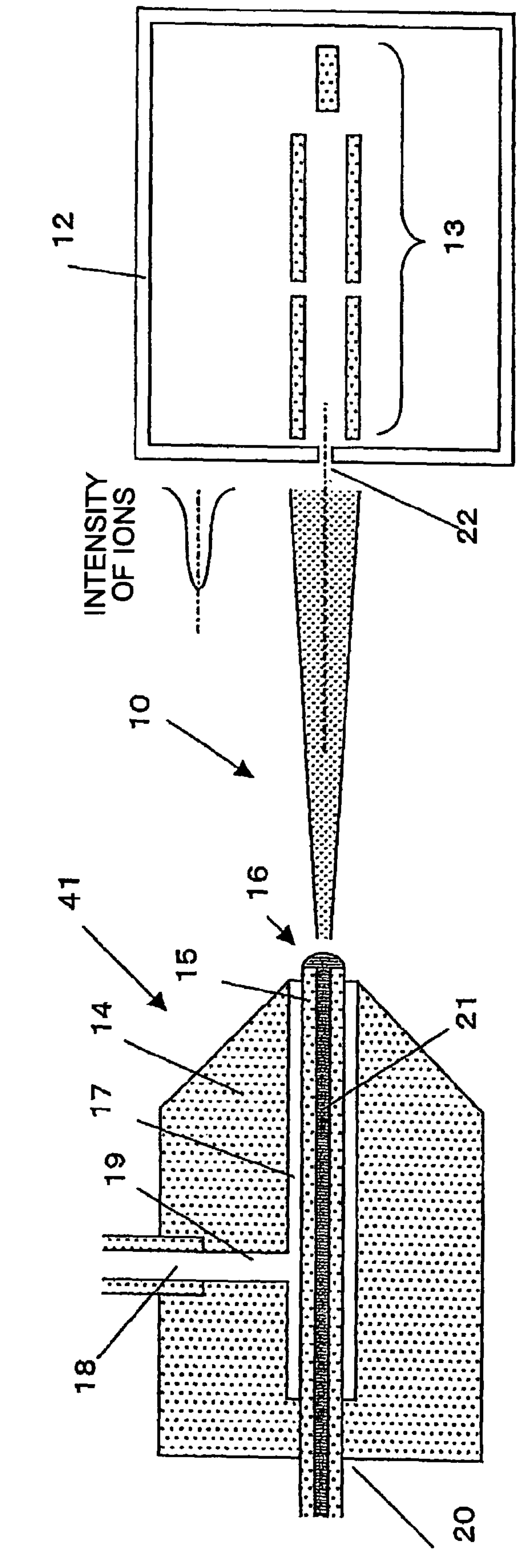
Fig. 6 PRIOR ART
FIG. 6 is a longitudinal sectional view of the front part of the ion source used in a conventional mass spectrometer.

An embodiment of the present invention is described with reference to the attached drawings. FIG. 1 is a longitudinal sectional view of the front part of the ion source used in a mass spectrometer as an embodiment of the present invention. In FIG. 1, those elements which have already been shown in FIG. 6 are denoted by the same numerals, the explanations for these elements are partially omitted. The front part of the ion source in this embodiment is attachable to and detachable from the rear part of the ion source, which is not shown in FIG. 1. As described later, when the front part is detached, the user can adjust the pressing member located within the ion source. The front and rear parts of the ion source are connected, for example, by a flange mechanism having a seal for closing the space between the connection faces of the two parts when they are combined. Other features of the construction of the rear part of the present embodiment are basically the same as shown in FIG. 6.

The mass spectrometer 10 includes an ion source 11 exposed to approximate atmospheric pressure and a mass spectrometer unit 13 enclosed in the vacuum chamber 12.

The ion source 11 includes a gas transport pipe 14 having a gas supply passage 17 and a liquid supply pipe 15 inserted into the gas supply passage 17.

The inner surface of the gas supply passage 17 has a tapered section 5 in proximity to the ejection port 16, where the diameter of the tapered section 5 decreases toward the ejection port 16. The tapered section 5 is worked with a lathe, and its central axis coincides with that of the gas supply passage 17. The inner surface of the gas supply passage 17 also has a thread groove 6 worked with a lathe, and a tightening ring 4 having a thread on its outer circumference is screwed into the thread groove 6.

In the gas supplying passage 17, six spheres 2 of the same size are inserted between the outer surface of the liquid supply pipe 15 and the inner surface of the gas supply passage 17, though FIG. 1 shows only two of the six spheres 2. It should be noted that the number and size of the spheres 2 could be varied, as described later. The spheres 2 are pressed onto the tapered section 5 by a pressing cylinder 3, which is fixed by the tightening ring 4 screwed into the thread groove 6.

The liquid supply pipe 15 is set in the ion source 11 as follows.

Figure 7A:
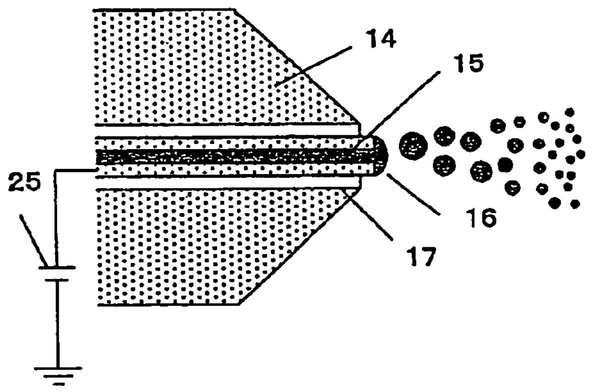
Fig. 7A PRIOR ART
FIGS. 7A–7D are longitudinal sectional views showing examples of conventional ion sources.
Figure 7B:
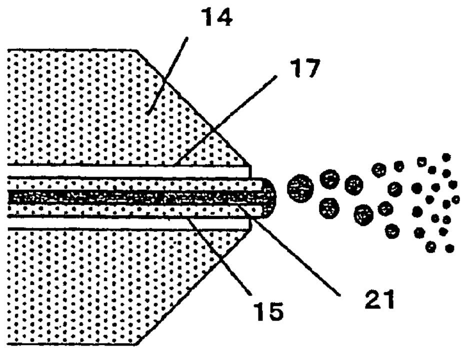
Fig. 7B PRIOR ART
Figure 7C:
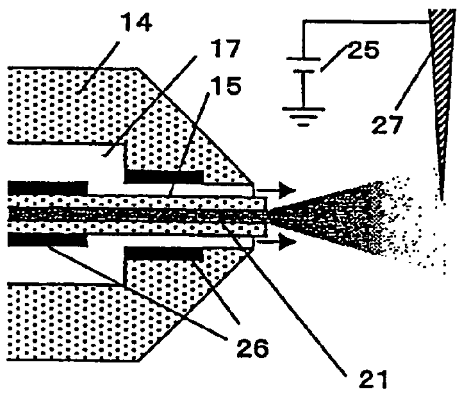
Fig. 7C PRIOR ART
Figure 7D:
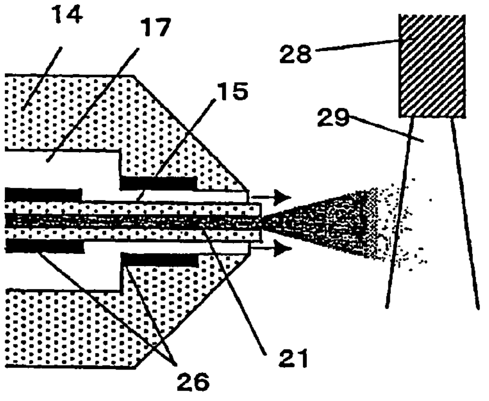
Fig. 7D PRIOR ART
Figure 8:
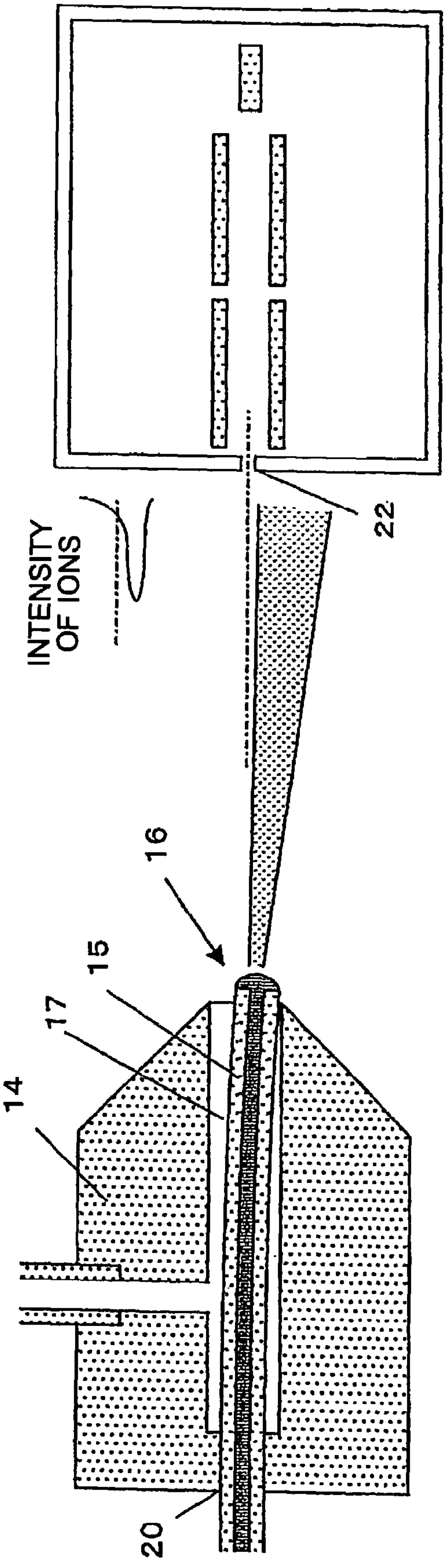
Fig. 8 PRIOR ART
FIG. 8 is a longitudinal sectional view of the front part of an ion source, in which the liquid supply pipe is out of the coaxial position.
Figure 9A:
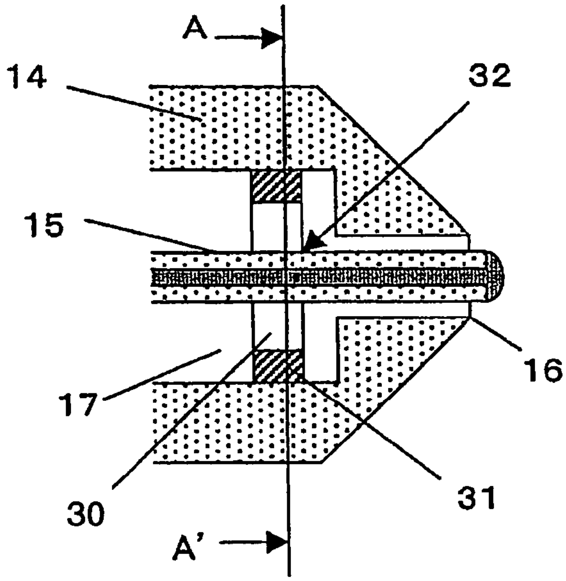
Fig. 9A PRIOR ART
FIGS. 9A and 9B show the construction of the front part of a conventional ion source, where
Figure 9B:
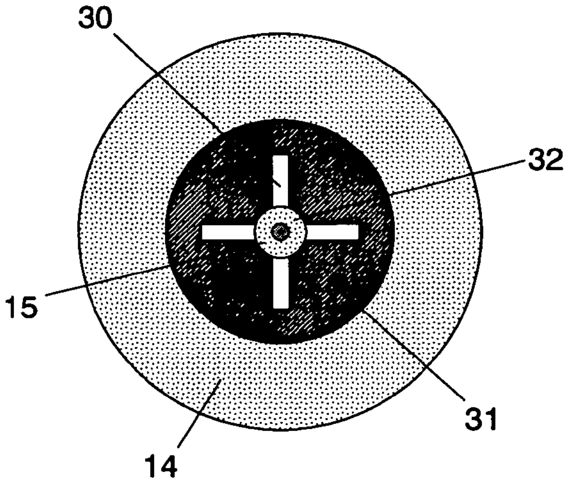
Fig. 9B PRIOR ART
Figure 10A:
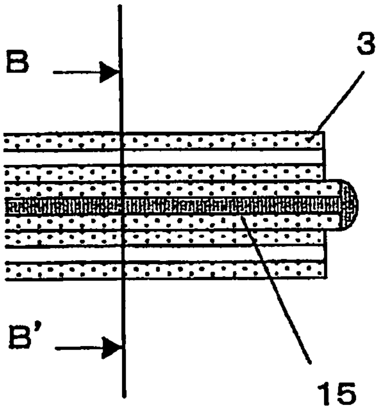
Fig. 10A PRIOR ART
FIGS. 10A and 10B show the construction of the front part of another conventional ion source, where
Figure 10B:
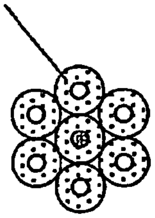
Fig. 10B PRIOR ART

First, with the spheres 2 and the pressing cylinder 3 set in the gas supply passage 17, the liquid supply pipe 15 is inserted into the gas supply passage 17 so that the front end of the liquid supply pipe 15 is located at the ejection port 16. It is preferable to adjust the liquid supply pipe 15 so that its front end slightly sticks out from the ejection port 16. Particularly, as in the case of the electrospray ionization (FIG. 7A), if a voltage is applied to the liquid supply pipe 15, it is recommended to make the front end stick out so that the electric field can concentrate on it.

Next, the tightening ring 4 is screwed into the thread groove 6 to press the spheres 2 onto the tapered section 5 via the pressing cylinder 3. Then, being pushed by the pressing cylinder 3, the spheres 2 come closer to not only the ejection port 16 but also the central axis of the tapered section 5, while pushing the liquid supply pipe 15 toward the center of the tapered section 5, i.e. the central axis of the gas supply passage 17. Since the six spheres 2 have the same size and the tapered section 5 is symmetrical with respect to its central axis, the six spheres 2 uniformly move toward the center of the tapered section 5 and finally hold the liquid supply pipe 15 exactly on the central axis of the gas supply passage 17. Thus, the gas supply passage 17 and the liquid supply passage 15 are maintained in the coaxial position.

Figure 2:
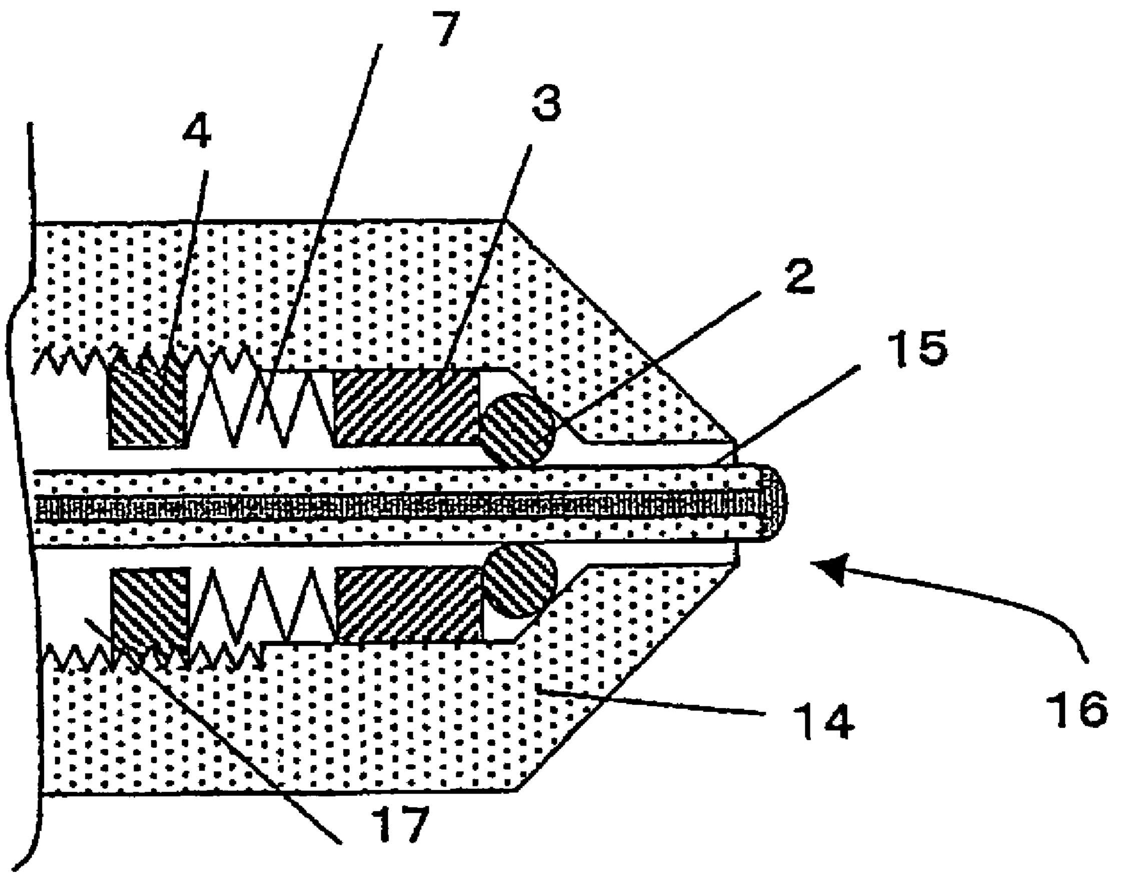
FIG. 2 is a longitudinal sectional view of the front part of the ion source used in a mass spectrometer as another embodiment of the present invention.

FIG. 2 shows a modification of the above-described embodiment. The ion source shown in FIG. 2 includes a spring 7 inserted between the pressing cylinder 3 and the tightening ring 4.

The spring 7 presses the spheres 2 onto the tapered section 5 via the pressing cylinder 3. Similar to the case in FIG. 1, the spheres 2, which are pressed by the pressing cylinder 3, come closer to not only the ejection port 16 but also to the center of the tapered section 5, while pushing the liquid supply pipe 15 toward the central axis of the gas supply passage 17. Since the six spheres 2 have the same size and the tapered section 5 is symmetrical with respect to its central axis, the six spheres 2 uniformly move toward the center of the tapered section 5 and finally hold the liquid supply pipe 15 exactly on the central axis of the gas supply passage 17. Thus, the gas supply passage 17 and the liquid supply passage 15 are maintained in the coaxial position.

When the liquid supply pipe 15 needs to be cleaned or replaced with a new one, the user can easily take it out by exerting a force against the urging force of the spring 7; there is no need to loosen the tightening ring 4.

[Number and Size of Spheres]

The number and size of the spheres 2 inserted into the gas supply passage 17 are determined on the basis of the following principles.

It is preferable to determine the diameter of the liquid supply pipe 15 and that of the spheres 2 so that there is no space, or only the smallest space, left between the neighboring spheres 2. Uneven spacing of the spheres 2 may lead to a poor symmetry of the flow of the assist gas with respect to the central axis and accordingly deteriorate the form of the spray, even though the assist gas can diffuse and uniform itself to some extent.

Figure 3A:
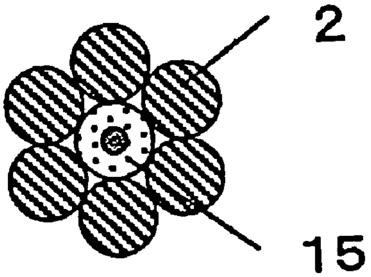
FIGS. 3A–3C are sectional views showing the spheres located around the liquid supply pipe.
Figure 3B:
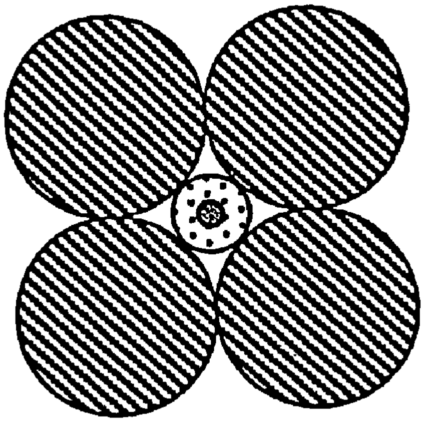
Figure 3C:
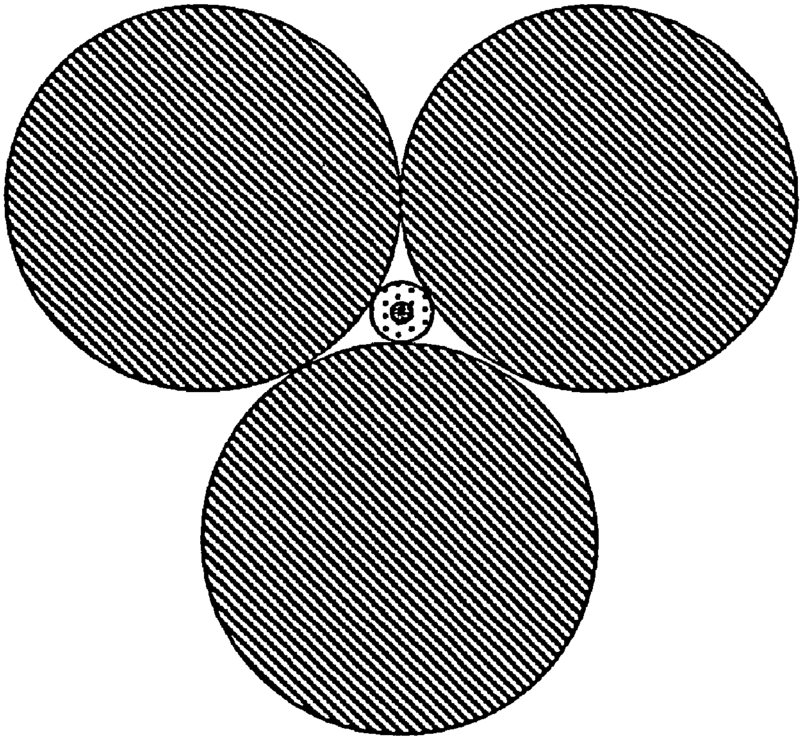

In principle, use of the three spheres 2 would suffice to coaxially hold the liquid supply pipe 15 with respect to the gas supply passage 17. However, in order to satisfy the aforementioned requirement that there should be no space left between the neighboring spheres 2, it is necessary to considerably increase the diameter of the gas supply passage 17 (and accordingly the size of the gas transport pipe 14) when there is only a small number of spheres 2 used. For example, in the case of using six spheres 2, the diameter of the spheres 2 is the same as that of the liquid supply pipe 15, as shown in FIG. 3A. If the number of the spheres 2 is decreased to four or three, it is necessary to increase the diameter of the spheres, as shown in FIGS. 3B and 3C. Therefore, if there is an upper limit for the size of the ion source 11, it is necessary to use a relatively large number of spheres 2. In view of the balance with the diameter of the liquid supply pipe 15, it is normally recommendable to use four to six pieces of the spheres 2.

Figure 4A:
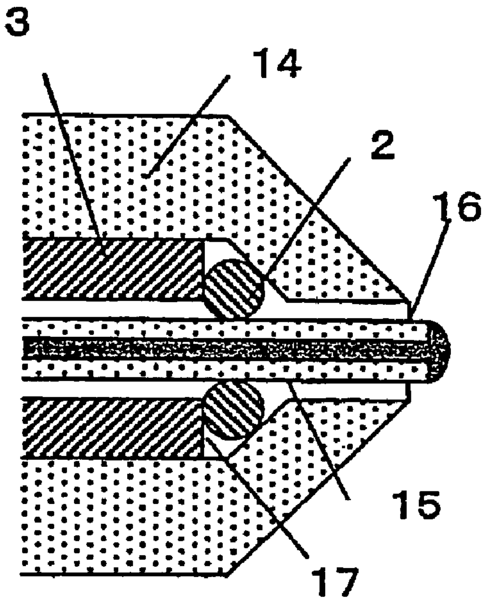
FIGS. 4A–4D are longitudinal sectional views showing the relation between the size of the spheres in the gas supply passage and the ejection port.
Figure 4B:
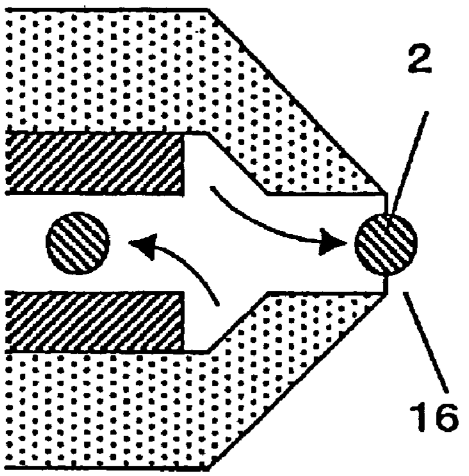

The user needs to so some maintenance work to the liquid supply pipe 15 when, for example, it is damaged by an electric discharge or it is clogged. In such a case, it is necessary to release the sphere 2 from the pressure caused by the pressing cylinder 3 and pull out the liquid supply pipe 15. Then, if the diameter of the sphere 2 is smaller than the ejection port 16, the sphere 2 may escape from the ejection port 16 and get lost during the maintenance work after the liquid supply pipe 15 is pulled out, as shown in FIGS. 4A and 4B.

Figure 4C:
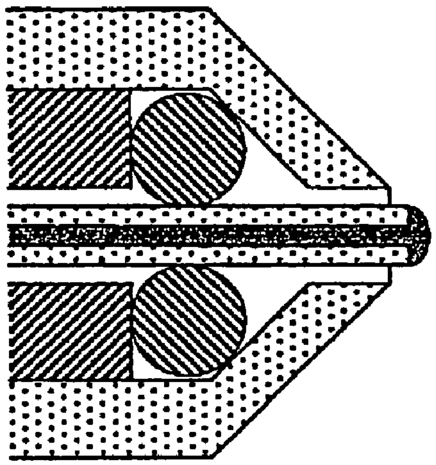
Figure 4D:
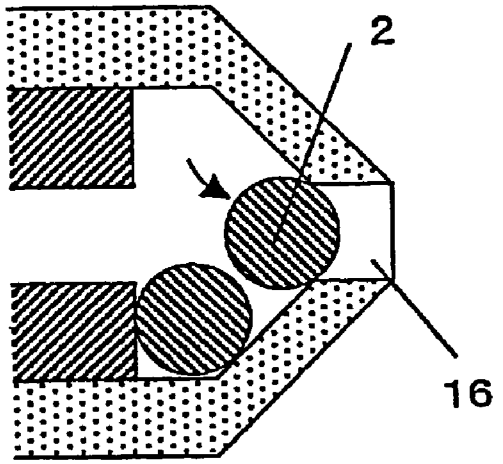

This problem can be avoided by making the sphere 2 larger than the ejection port 16 so that it cannot escape from the ejection port 16, as shown in FIGS. 4C and 4D.

[Spatial Relation Between Spheres and Ejection Port]

Figure 5:
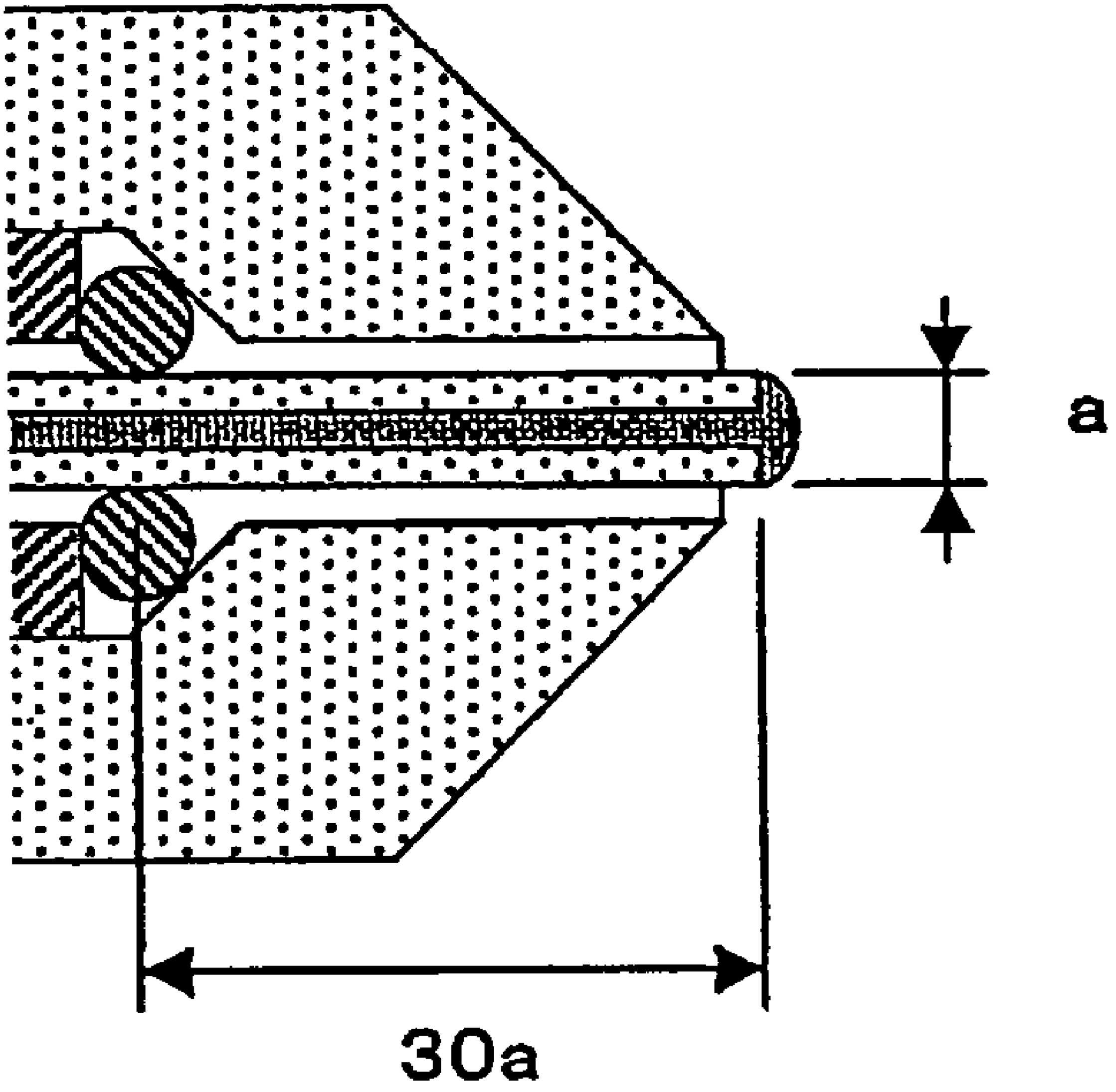
FIG. 5 is a longitudinal sectional view showing the distance of the front end of the liquid supply pipe from the spheres in the gas supply passage.

As the point at which the spheres 2 support the liquid supply pipe 15 is more distanced from the front end of the ejection port 16, the coaxiality of the liquid supply pipe 15 becomes lower due to sagging or other factors. Therefore, the spheres 2 should be positioned close enough to the ejection port 16. More specifically, with the diameter of the liquid supply pipe 15 denoted by $\alpha$, the distance from the front end of the liquid supply pipe 15 to the supporting point should be preferably about 30a or smaller, as shown in FIG. 5. This condition provides an adequate degree of coaxiality.

In the case of using a liquid supply pipe 15 that is tapered toward the front end, the aforementioned diameter can be measured at the position where the liquid supply pipe 15 is supported by the spheres.

As the supporting point of the spheres 2 is closer to the ejection port 16, the coaxiality of the liquid supply pipe 15 becomes higher. Therefore, it is preferable to make the wall of the tapered section 5 thinner so that the spheres 2 are allowed to come closer to the ejection port 16, provided that the thinning work is technically feasible and the tapered section 5 retains an adequate mechanical strength.

What is claimed is:

1. A mass spectrometer having an ion source for ionizing a liquid sample, wherein:

the ion source includes a gas transport pipe and a liquid supply pipe;

the gas transport pipe has an ejection port at its front end and a gas supply passage for sending an assist gas to the ejection port;

an inner surface of the gas supply passage has a tapered section located in proximity to the ejection port, where a diameter of the tapered section decreases toward the ejection port;

the liquid supply pipe is inserted into the gas supply passage so that a front end of the liquid supply pipe is located in proximity to the ejection port;

three or more spheres having the same size are inserted between the inner surface of the gas supply passage and an outer surface of the liquid supply pipe; and a pressing mechanism is used to press the spheres onto the tapered section.

2. The mass spectrometer according to claim 1, wherein the spheres are positioned in the gas supply passage so that each sphere is in contact with the neighboring spheres on both sides.

3. The mass spectrometer according to claim 1, wherein the number of the spheres is from four to six.

4. The mass spectrometer according to claim 1, wherein the diameter of the spheres is larger than that of the ejection port.

5. The mass spectrometer according to claim 1, wherein the pressing mechanism is constructed to press the spheres onto the tapered section via an urging member.

6. The mass spectrometer according to claim 1, wherein a distance between a point at which the sphere is in contact with the liquid supply pipe and the front end of the liquid supply pipe is thirty times as large as the maximum diameter of the liquid supply pipe, or smaller than that.

* * * * *